United States Patent
Ogawa et al.

(10) Patent No.: US 7,709,155 B2
(45) Date of Patent: May 4, 2010

(54) NONAQUEOUS ELECTROLYTIC SOLUTION AND LITHIUM-ION SECONDARY BATTERY

(75) Inventors: Kazuya Ogawa, Tokyo (JP); Atsushi Sano, Tokyo (JP); Tsuyoshi Iijima, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 1073 days.

(21) Appl. No.: 10/558,556

(22) PCT Filed: May 28, 2004

(86) PCT No.: PCT/JP2004/007765

§ 371 (c)(1), (2), (4) Date: Jan. 30, 2006

(87) PCT Pub. No.: WO2004/107493

PCT Pub. Date: Dec. 9, 2004

(65) Prior Publication Data

US 2007/0015063 A1     Jan. 18, 2007

(30) Foreign Application Priority Data

May 29, 2003  (JP) ............................. 2003-153049

(51) Int. Cl.
  *H01M 6/16* (2006.01)
  *H01M 4/58* (2010.01)
(52) U.S. Cl. .................... 429/330; 429/231.8
(58) Field of Classification Search .................... 429/59
  See application file for complete search history.

(56) References Cited

U.S. PATENT DOCUMENTS 6,927,001 B1    8/2005  Hamamoto et al.
2004/0185330 A1 * 9/2004 Yamaguchi et al. ........... 429/59

FOREIGN PATENT DOCUMENTS

| CN | 1277468 | 12/2000 |
|---|---|---|
| JP | A 10-339850 | 12/1998 |
| JP | A 11-067266 | 3/1999 |
| JP | A 11-339850 | 12/1999 |
| JP | A 2000-003724 | 1/2000 |
| JP | A 2000-003725 | 1/2000 |

(Continued)

*Primary Examiner*—Patrick Ryan
*Assistant Examiner*—Ashley Kwon
(74) *Attorney, Agent, or Firm*—Oliff & Berridge, PLC

(57) ABSTRACT

A nonaqueous solvent in a nonaqueous electrolytic solution in a lithium-ion secondary battery 1 contains propylene carbonate (PC), a first compound expressed by formula (I), and a second compound expressed by formula (II). The content of PC in the nonaqueous solvent is at least 10 volume %. The content X [mass %] of the first compound and the content Y [mass %] of the second compound simultaneously satisfy the conditions represented by expressions (1) and (2) [$2 \leq (X+Y) \leq 8$ (1), $0.01 \leq (Y/X) \leq 0.30$ (2)]. $R^1$ to $R^6$ in formula (I) indicate any of a hydrogen atom and hydrocarbon groups having a carbon number of 1 to 3, whereas $R^7$ and $R^8$ in formula (II) indicate any of a hydrogen atom and hydrocarbon groups having a carbon number of 1 to 3.

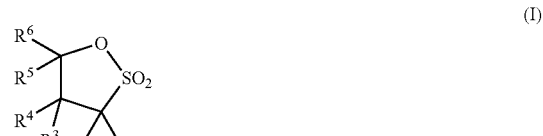

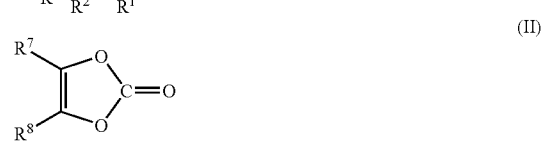

13 Claims, 4 Drawing Sheets

FOREIGN PATENT DOCUMENTS

| | | | |
|---|---|---|---|
| JP | A 2000-058125 | | 2/2000 |
| JP | 2001-043895 | * | 2/2001 |
| JP | 2001/043895 | * | 2/2001 |
| JP | A 2001-043895 | | 2/2001 |
| JP | A 2002-083632 | | 3/2002 |
| JP | A 2003-077534 | | 3/2003 |
| JP | A 2003-151623 | | 5/2003 |
| JP | A 2004-014459 | | 1/2004 |
| JP | A 2004-087168 | | 3/2004 |
| JP | A 2004-235145 | | 8/2004 |

* cited by examiner

NONAQUEOUS ELECTROLYTIC SOLUTION AND LITHIUM-ION SECONDARY BATTERY

TECHNICAL FIELD

The present invention relates to a nonaqueous electrolytic solution and a lithium-ion secondary battery.

BACKGROUND ART

Recently, electronic devices, portable electronic devices in particular, have remarkably been evolving, with which development of batteries having a high energy density has been in demand. As such a battery, lithium-ion secondary batteries have widely been employed as power supplies for portable devices because of their very high energy density and the like. A lithium-ion secondary battery is mainly constituted by a cathode, an anode, a separator, and a nonaqueous electrolytic solution, whereas various studies have been made in order to further improve battery characteristics.

For example, preferred as a nonaqueous solvent for the nonaqueous electrolytic solution is one having a relatively low melting point, a relatively high conductivity, a relatively wide potential window (electrochemical window), and a capability of yielding a high ionic conductivity even at a low temperature when an electrolyte is dissolved. From this viewpoint, propylene carbonate has favorably been in use. When provided with a negative electrode (anode) using a carbon material such as highly crystallized graphite as a constituent material, however, propylene carbonate has been problematic in that its decomposition proceeds in a cathode (an electrode which functions as a negative electrode at the time of discharging) at the time of charging in particular.

When the decomposition of propylene carbonate proceeds, a gas is generated, with which the carbon material of the negative electrode peels off, decomposes, etc., thereby causing problems of decrease in capacity and gradual deterioration in battery characteristics such as charging/discharging cycle characteristic while in use. As the decomposition of propylene carbonate progresses, decomposition products are deposited on the negative electrode, which also seems to gradually deteriorate the battery characteristics mentioned above.

Therefore, batteries aimed at restraining the decomposition reaction of propylene from proceeding by adding 1,3-propane sultone or 1,4-butane sultone into a nonaqueous electrolytic solution using at least propylene carbonate as an ingredient of the nonaqueous solvent have been proposed (see, for example, Japanese Patent Application Laid-Open Nos. 2000-3724 and 2000-3725).

Also, a battery preventing electrolysis from occurring on the negative electrode surface of propylene carbonate by adding 1,3-propane sultone into a nonaqueous electrolytic solution using a mixed solvent of propylene carbonate, ethylene carbonate, and diethyl carbonate has been proposed (see, for example, Japanese Patent Application Laid-Open No. HEI 11-339850).

Further, batteries aimed at restraining the decomposition reaction of propylene carbonate from progressing by adding vinylene carbonate into a nonaqueous electrolytic solution using at least propylene carbonate as an ingredient of the nonaqueous solvent have been proposed (see, for example, Japanese Patent Application Laid-Open Nos. HEI 11-67266 and 2000-58125).

Furthermore, a battery aimed at restraining the decomposition reaction of propylene carbonate from progressing by adding 1,3-propane sultone and vinylene carbonate into a nonaqueous electrolytic solution using at least propylene carbonate as an ingredient of the nonaqueous solvent has been proposed (see, for example, Japanese Patent Application Laid-Open No. 2001-43895).

DISCLOSURE OF THE INVENTION

However, the inventors have found that, when provided with a negative electrode using a carbon material having a high degree of graphitization as a constituent material, the conventional lithium-ion secondary batteries disclosed in Japanese Patent Application Laid-Open Nos. 2000-3724, 2000-3725, and HEI 10-339850 mentioned above can form a decomposition-suppressing film for propylene carbonate, but the chemical stability of the film is insufficient, whereby a sufficient charging/discharging cycle characteristic is not obtained.

The inventors have also found that, when provided with a negative electrode using a carbon material having a high degree of graphitization as a constituent material, the conventional lithium-ion secondary batteries disclosed in Japanese Patent Application Laid-Open Nos. HEI 11-67266 and 2000-58125 mentioned above improve the charging/discharging cycle characteristic since they can form a decomposition-restraining film having a relatively high chemical stability for propylene carbonate, but fail to attain a sufficient high-rate discharging characteristic.

The inventors have found that these batteries also generate a gas when a reduction product of a cathode for charging (negative electrode for discharging) is oxidized at an anode for charging (positive electrode for discharging), so that the gas generation is not sufficiently suppressed when the batteries are stored or caused to generate power at a high temperature (40 to 100° C.) in particular. When a case is formed from a film in particular, the case may expand during its use or storage, or a sealing part of the case may peel off, thereby causing leakage, thus failing to achieve a sufficient reliability.

The inventors have found that the conventional lithium-ion secondary battery disclosed in Japanese Patent Application Laid-Open No. 2001-43895 can attain an effect of restraining the decomposition reaction of propylene carbonate from proceeding, for example, such that the gas generation can be suppressed even when provided with a negative electrode using a carbon material having a high degree of graphitization as a constituent material, but incurs the following problem. Namely, this battery fails to attain a sufficient charging/discharging cycle characteristic.

In view of the problems in the prior art mentioned above, it is an object of the present invention to provide a nonaqueous electrolytic solution which can easily and reliably construct a lithium-ion secondary battery capable of attaining excellent initial power generation efficiency, high-rate discharging characteristic, and charging/discharging cycle characteristic, while being able to achieve an excellent reliability even when stored or caused to generate power within the range of 40 to 100° C.; and a high-performance lithium-ion secondary battery including this nonaqueous electrolytic solution.

The inventors conducted diligent studies in order to achieve the above-mentioned object and, as a result, have found that, when 1,3-propane sultone (which will hereinafter be referred to as "PS" when necessary) and vinylene carbonate (which will hereinafter be referred to as "VC" when necessary) are added into a nonaqueous electrolytic solution using at least propylene carbonate as an ingredient of a nonaqueous solvent, the chemical stability of a protective film generated on the surface of a negative electrode as each of PS and VC is decomposed heavily depends on respective contents of PS and VC in the nonaqueous electrolytic solution and the ratio between the respective amounts of addition of PS and VC.

The inventors have further found it quite effective in achieving the above-mentioned object to regulate the ingredient composition of the nonaqueous solvent in the nonaqueous electrolytic solution so as to satisfy the following condition, thereby attaining the present invention.

Namely, the present invention provides a nonaqueous electrolytic solution including a nonaqueous solvent and a lithium salt soluble in the nonaqueous solvent; wherein the nonaqueous solvent contains propylene carbonate, a first compound expressed by the following general formula (I), and a second compound expressed by the following general formula (II); wherein the content of propylene carbonate in the nonaqueous solvent is at least 10 volume %; and wherein the content X [mass %] of the first compound and the content Y [mass %] of the second compound simultaneously satisfy the conditions represented by the following expressions (1) and (2):

$$2 \leq (X+Y) \leq 8 \quad (1)$$

$$0.01 \leq (Y/X) \leq 0.30 \quad (2)$$

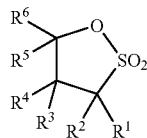

(I)

where $R^1$, $R^2$, $R^3$, $R^4$, $R^5$, and $R^6$ are either identical to or different from each other, indicating any of a hydrogen atom and hydrocarbon groups having a carbon number of 1 to 3;

(II)

where $R^7$ and $R^8$ are either identical to or different from each other, indicating any of a hydrogen atom and hydrocarbon groups having a carbon number of 1 to 6.

The nonaqueous electrolytic solution of the present invention uses a nonaqueous solvent having an ingredient configuration simultaneously satisfying the conditions mentioned above, and thus can yield the following effect when used as an electrolyte for a lithium-ion secondary battery. Namely, it can easily and reliably construct a lithium-ion secondary battery capable of attaining excellent initial power generation efficiency, high-rate discharging characteristic, low-temperature discharging characteristic, and charging/discharging cycle characteristic, while being able to achieve an excellent reliability even when stored or caused to generate power within the range of 40 to 100° C.

Though no detailed mechanism of yielding this effect has clearly been elucidated, the inventors presume that the above-mentioned effect is obtained because the use of a nonaqueous solvent having an ingredient configuration simultaneously satisfying the conditions mentioned above forms a protective film having an excellent chemical stability against charging/discharging reactions which repeatedly proceed on the negative electrode surface along with charging/discharging.

Satisfying the condition of expression (1) can improve the initial power generation efficiency, the high-rate discharging characteristic, and the discharging characteristic at a low temperature (−20 to +25° C.) in particular. Satisfying the condition of (2) can improve the charging/discharging cycle in particular, whereby gases can fully be restrained from occurring within a case when the battery is stored or caused to generate power within the range of 40 to 100° C. Satisfying the conditions of expressions (1) and (2) at the same time can yield the above-mentioned effect of the present invention without lowering any of the characteristics mentioned above.

In the present invention, "the content X [mass %] of the first compound" does not refer to the content of the first compound in the nonaqueous solvent, but the content based on the total mass of the finally obtained nonaqueous electrolytic solution. Also, "the content Y [mass %] of the second compound" does not refer to the content of the first compound in the nonaqueous solvent, but the content based on the total mass of the finally obtained nonaqueous electrolytic solution.

When the content of propylene carbonate (which will hereinafter be referred to as "PC" when necessary) is less than 10 volume %, a sufficient charging/discharging characteristic cannot be obtained at a low temperature (−20 to +25° C.). When the value of (X+Y) is less than 2 mass %, a protective film which is chemically stable against charging/discharging reactions proceeding on the negative electrode surface cannot fully be formed, whereby the effect of the present invention cannot be obtained. When the value of (X+Y) exceeds 8 mass %, a high-rate discharging characteristic and a sufficient charging/discharging characteristic at a low temperature (−20 to +25° C.) cannot be obtained. When the value of (Y/X) is less than 0.01, a sufficient charging/discharging characteristic cannot be obtained. When the value of (Y/X) exceeds 0.30, a sufficient charging/discharging characteristic cannot be obtained either.

From the viewpoint of more reliably attaining the effect of the present invention mentioned above, it will be preferred if X and Y in expressions (1) and (2) in the present invention further satisfy the following expressions (3) and (4):

$$0 < X \leq 7 \quad (3)$$

$$0 < Y \leq 1.5 \quad (4)$$

From the viewpoint of more reliably attaining the effect of the present invention mentioned above, it will be preferred if the content of propylene carbonate in the nonaqueous solvent is 10 to 60 volume % in the present invention. When the content of PC exceeds 60 volume %, the decomposition reaction of PC is easier to proceed.

From the viewpoint of more reliably attaining the effect of the present invention mentioned above, it will be preferred if the nonaqueous solvent further contains ethylene carbonate whose content is 1 to 20 volume % in the present invention. In the case where ethylene carbonate (which will hereinafter be referred to as "EC" when necessary) is further contained, the decomposition reaction of PC is easier to proceed when the content of EC is less than 1 volume %. When the content of EC exceeds 20 volume %, a sufficient charging/discharging characteristic is less likely to be obtained at a low temperature (−20 to +25° C.).

From the viewpoint of more reliably attaining the effect of the present invention mentioned above, it will be preferred if the nonaqueous solvent further contains a chain carbonate whose content is 30 to 85 volume %. In the case where the chain carbonate is further contained, a sufficient high-rate discharging characteristic is less likely to be obtained when the content of chain carbonate is less than 30 volume %. Also, in this case, a sufficient high-rate discharging characteristic is less likely to be obtained at a low temperature (−20 to +25° C.). When the content of chain carbonate exceeds 85 volume %, a sufficient charging capacity is less likely to be obtained. From the viewpoint of more reliably attaining the effect of the present invention, it will be preferred if the chain carbonate is diethyl carbonate (which will hereinafter be referred to as "DEC" when necessary) and/or ethylmethyl carbonate (which will hereinafter be referred to as "EMC" when necessary).

From the viewpoint of more reliably attaining the effect of the present invention mentioned above, it will be preferred if $R^1, R^2, R^3, R^4, R^5$, and $R^6$ in the first compound are hydrogen atoms in the present invention. Namely, the first compound is preferably 1,3-propane sultone.

From the viewpoint of more reliably attaining the effect of the present invention mentioned above, it will be preferred if $R^7$ and $R^8$ in the second compound are hydrogen atoms in the present invention. Namely, the second compound is preferably vinylene carbonate.

The nonaqueous electrolytic solution of the present invention may be gelled by a gelling agent. This can construct a so-called lithium-ion polymer secondary battery.

The present invention also provides a lithium-ion secondary battery comprising, at least, an anode, a cathode, an insulating separator disposed between the anode and cathode, a nonaqueous electrolytic solution containing a lithium salt, and a case accommodating the anode, cathode, separator, and a nonaqueous electrolytic solution in a closed state; wherein the nonaqueous electrolytic solution is any of the nonaqueous electrolytic solutions in accordance with the present invention mentioned above.

The lithium-ion secondary battery of the present invention is configured so as to include the nonaqueous electrolytic solution of the present invention mentioned above, and thus can achieve excellent initial power generation efficiency, high-rate discharging characteristic, and charging/discharging cycle characteristic, while being able to attain an excellent reliability even when stored or caused to generate power within the range of 40 to 100° C.

In the present invention, electrodes to act as the anode and cathode become a reaction field capable of reversibly advancing an electron transfer reaction in which a lithium ion (or metal lithium) is involved as a redox species. Here, "reversibly advancing an electron transfer reaction" refers to reversibly advancing the above-mentioned electron transfer reaction within a battery life required for a power supply or auxiliary power supply of a device to which the battery is mounted.

Anode active materials contained as a constituent material in the anode and cathode active materials contained as a constituent material in the cathode refer to materials contributing to the above-mentioned electron transfer reaction. The anode active materials and cathode active materials may be carbon materials or metal oxides having structures which can reversibly proceed with occlusion/release of lithium ions or desorption/insertion (intercalation) of lithium ions. A material capable of reversibly proceeding with doping/undoping of lithium ions with their counter anions (e.g., $ClO_4^-$), such as a conductive polymer, may also be used as an anode active material and/or cathode active material singly or together with other active materials.

In this specification, for convenience of explanation, "anode" in "anode active material" is one (negative electrode active material) based on its polarity at the time of discharging the battery, and "cathode" in "cathode active material" is also one (positive electrode active material) based on its polarity at the time of discharging the battery. Specific examples of the anode active material and cathode active material will later be explained.

In the lithium-ion secondary battery in accordance with the present invention, it will be preferred if the case is formed from a flexible film (which will hereinafter be referred as "film"), and is formed by using at least a pair of films opposing each other, whereas the film is preferably a composite package film comprising, at least, an innermost layer made of a synthetic resin in contact with the nonaqueous electrolytic solution and a metal layer disposed above the innermost layer, i.e., on the outside of the innermost layer.

When the case is thus formed from a composite package film, the lithium-ion secondary battery itself can be formed like a thin film. This can easily improve the original volume energy density and the energy density per unit volume of a space where the lithium-ion secondary battery is to be placed (which will hereinafter be referred to as "volume energy density based on the volume of the space to place").

Here, the "volume energy density" of the lithium-ion secondary battery is originally defined by the ratio of the total output energy with respect to the whole volume of the part contributing to power generation constituted by the electrodes and separator (i.e., "matrix" which will be explained later) of the lithium-ion secondary battery or the whole volume thereof including its container. By contrast, the "volume energy density based on the volume of the space to place" refers to the ratio of the total output energy of the lithium-ion secondary battery with respect to an apparent volume of the lithium-ion secondary battery determined according to the maximum length, maximum width, and maximum thickness thereof. When mounting the lithium-ion secondary battery to a small-size electronic device in practice, it is important from the viewpoint of effectively utilizing a limited space within the small-size electronic device while fully reducing a dead space to improve the above-mentioned original volume energy density and the volume energy density based on the volume of the space to place.

In the present invention, the case is not limited to one formed from the above-mentioned composite package film, but may be a case made of a metal such as a metal can shell. The latter can be employed in uses where the case requires a mechanical strength higher than that of the composite package film.

It will be preferred in the lithium-ion secondary battery of the present invention if each of the anode and cathode has a planar form and contains an electronically conductive porous body as a constituent material, the separator has a planar form and is made of an insulating porous body, and the nonaqueous electrolytic solution is at least partly contained within the anode, cathode, and separator. Employing such a configuration can further improve the volume energy density based on the volume of the space to place. The above-mentioned "planar" state encompasses flat and curved planar states as well.

BEST MODES FOR CARRYING OUT THE INVENTION

In the following, preferred embodiments of the lithium-ion secondary battery in accordance with the present invention will be explained in detail with reference to the drawings. In the following explanation, parts identical or equivalent to each other will be referred to with numerals identical to each other without repeating their overlapping descriptions.

Figure 1:
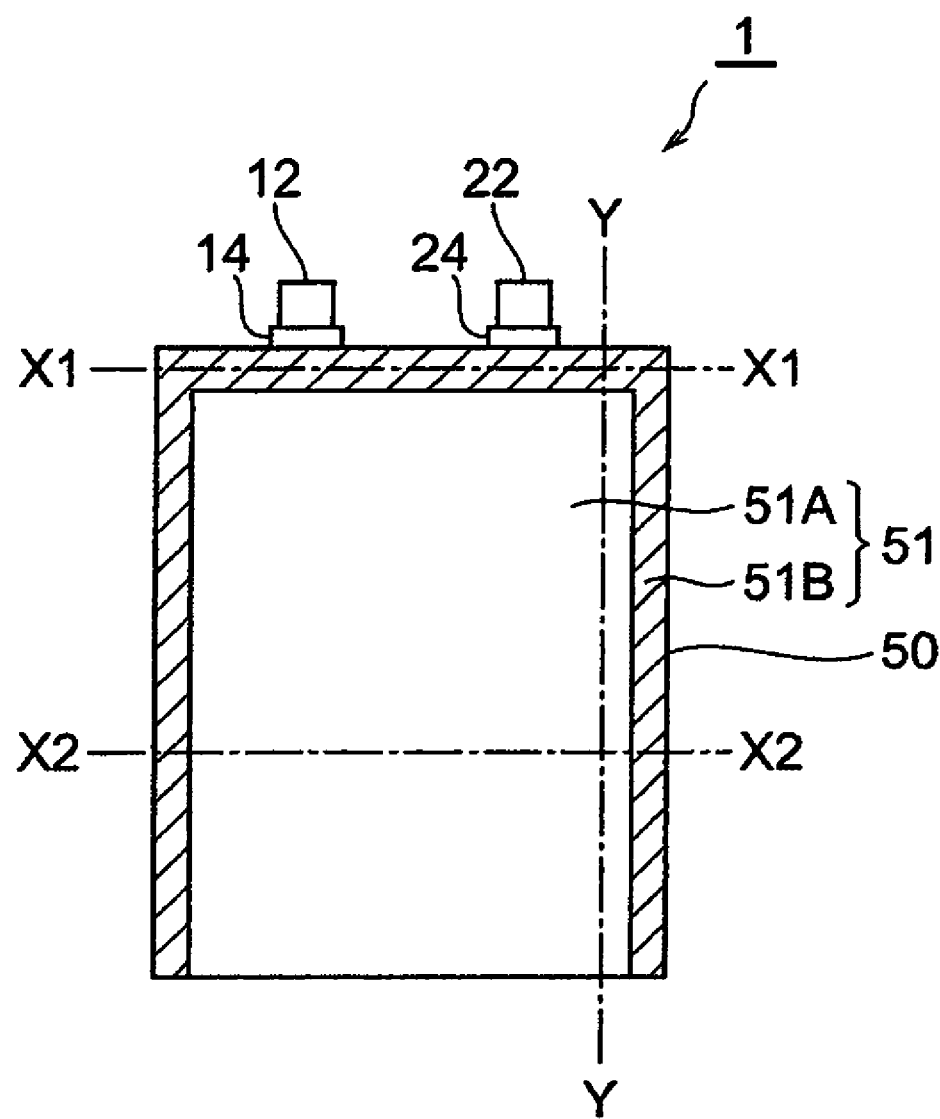
FIG. 1 is a front view showing a preferred embodiment of the lithium-ion secondary battery in accordance with the present invention.
Figure 2:
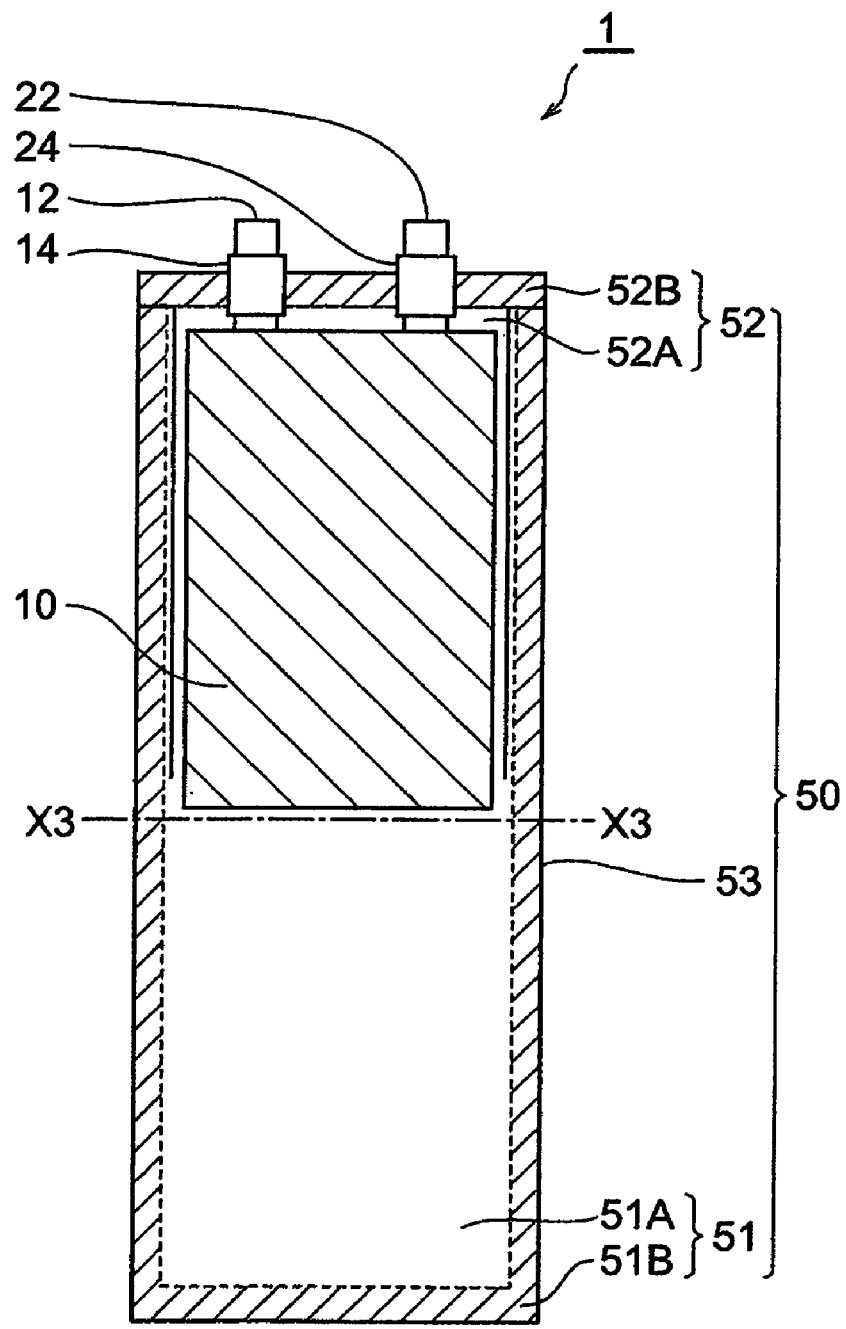
FIG. 2 is an unfolded view of the inside of the lithium-ion secondary battery shown in FIG. 1 as seen in a direction normal to a surface of an anode.
Figure 3:
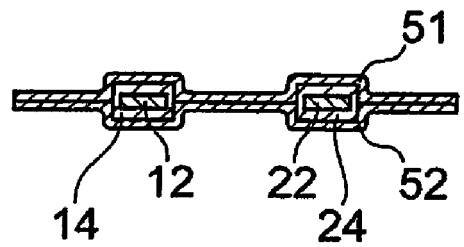
FIG. 3 is a schematic sectional view of the lithium-ion secondary battery shown in FIG. 1 taken along the line X1-X1 of FIG. 1.
Figure 4:
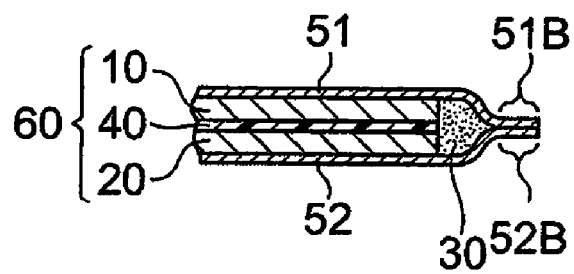
FIG. 4 is a schematic sectional view showing a major part of the lithium-ion secondary battery shown in FIG. 1 taken along the line X2-X2 of FIG. 1.
Figure 5:
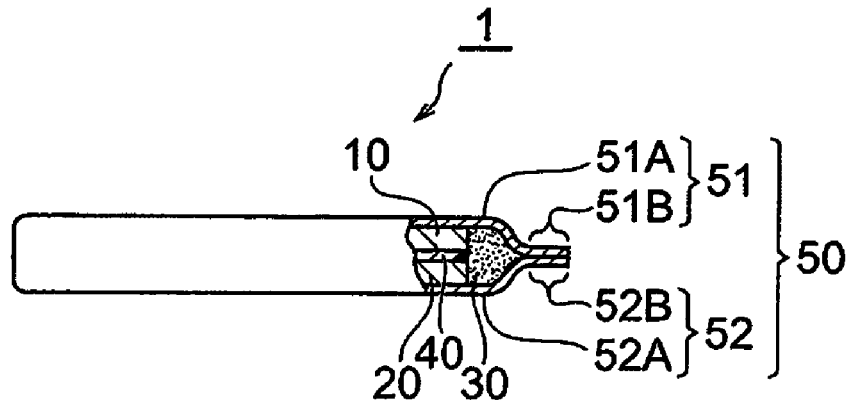
FIG. 5 is a partly broken side view of the lithium-ion secondary battery shown in FIG. 1.

FIG. 1 is a front view showing a preferred embodiment of the lithium-ion secondary battery in accordance with the present invention. FIG. 2 is an unfolded view of the inside of the lithium-ion secondary battery shown in FIG. 1 as seen in a direction normal to a surface of an anode 10. FIG. 3 is a schematic sectional view of the lithium-ion secondary battery shown in FIG. 1 taken along the line X1-X1 of FIG. 1. FIG. 4 is a schematic sectional view showing a major part of the lithium-ion secondary battery shown in FIG. 1 taken along the line X2-X2 of FIG. 1. FIG. 5 is a partly broken side view of the lithium-ion secondary battery shown in FIG. 1, whereas its partial section illustrates a major part taken along the line Y-Y of FIG. 1.

As shown in FIGS. 1 to 5, the lithium-ion secondary battery 1 is mainly constituted by the planar anode 10 and a planar cathode 20 which oppose each other, a planar separator 40 disposed between the anode 10 and cathode 20 adjacent to both of the anode 10 and cathode 20, a nonaqueous electrolytic solution 30, a case 50 accommodating them in a closed state, an anode lead 12 having one end part electrically connected to the anode 10 and the other end part projecting out of the case 50, and a cathode lead 22 having one end part electrically connected to the cathode 20 and the other end part projecting out of the case 50. Here, for convenience of explanation, the "anode" 10 and "cathode" 20 are determined according to their polarities at the time when discharging the lithium-ion secondary battery 1. Therefore, the "anode 10" and "cathode 20" become "cathode" and "anode," respectively, at the time of charging.

For achieving the object of the present invention mentioned above, the lithium-ion secondary battery 1 has a configuration which will be explained in the following.

With reference to FIGS. 1 to 9, details of individual constituents in this embodiment will now be explained.

The case 50 comprises a pair of films (first film 51 and second film 52) which oppose each other. As shown in FIG. 2, the first film 51 and second film 52 in this embodiment are connected to each other. Namely, a rectangular film made of a single composite package film is folded at a fold line X3-X3 shown in FIG. 2, and a pair of opposing fringes of the rectangular film (a fringe 51B of the first film 51 and a fringe 52B of the second film 52 in the drawing) are overlaid on each other and sealed with an adhesive or by heat, whereby the case 50 in this embodiment is formed.

The first film 51 and second film 52 represent respective film parts having surfaces opposing each other when a single rectangular film 53 is folded as mentioned above.

Since the first film 51 and second film 52 are obtained when the single rectangular film 53 is folded as mentioned above, no margins for connecting the first film 51 and second film 52 to each other are required at the part of fold line X3-X3. This can further reduce seal parts in the case 50. As a result, the energy density based on the volume of a space where the lithium-ion secondary battery 1 is to be placed can further be improved.

In this embodiment, as shown in FIGS. 1 and 2, respective one ends of the anode lead 12 connected to the anode 10 and the cathode lead 22 are arranged so as to project out of the seal part where the fringe 51B of the first film 51 and the fringe 52B of the second film are connected to each other.

The film constituting the first film 51 and second film 52 is a flexible film as mentioned above. Since the film is light in weight and can easily be formed into a thin film, the lithium-ion secondary battery itself can be formed into a thin film. This can easily improve the original volume energy density of the lithium-ion secondary battery 1, and the volume energy density based on the volume of the space where the lithium-ion secondary battery 1 is to be placed.

The first film 51 and second film 52 are not restricted in particular as long as they are flexible films. However, from the viewpoint of securing a sufficient mechanical strength and lightweight of the case 50 while effectively preventing the moisture and air from entering the case 50 from the outside and the dissipation of electrolyte components from the inside of the case 50 to the outside from occurring, the films are preferably a "composite package film" comprising, at least, an innermost layer made of a synthetic resin in contact with the nonaqueous electrolytic solution 30, and a metal layer disposed on one side of the innermost layer, i.e., on the outside of the innermost layer.

Figure 6:
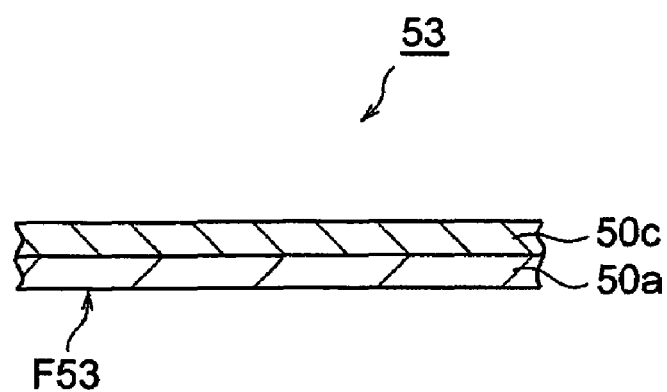
FIG. 6 is a schematic sectional view showing an example of basic configuration of a film constituting a case of the lithium-ion secondary battery shown in FIG. 1.
Figure 7:
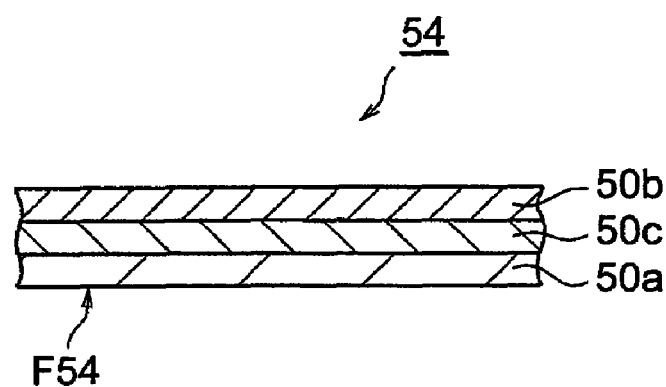
FIG. 7 is a schematic sectional view showing another example of basic configuration of the film constituting the case of the lithium-ion secondary battery shown in FIG. 1.

Examples of composite package films usable as the first film 51 and second film 52 include those having the configurations shown in FIGS. 6 and 7. The composite package film 53 shown in FIG. 6 comprises an innermost layer 50a made of a synthetic resin in contact with the nonaqueous electrolytic solution by its inner face F53, and a metal layer 50c disposed on the other surface (outer face) of the innermost layer 50a. The composite package film 54 shown in FIG. 7 has a configuration in which an outermost layer 50b made of a synthetic resin is further disposed on the outer face of the metal layer 50c in the composite package film 53 shown in FIG. 6, i.e., on the side of the metal layer 50c opposite from the innermost layer 50a.

The composite package film usable as the first film 51 and second film 52 is not limited in particular as long as it is a composite package film comprising at least two layers composed of at least one synthetic resin layer such as the above-mentioned innermost layer, and a metal layer made of a metal foil or the like. From the viewpoint of more reliably attaining the same effects as those mentioned above, however, it will be more preferred if the film is constituted by at least three layers comprising the innermost layer 50a, the outermost layer 50b made of a synthetic resin disposed on the outer surface side of the case 50 farthest from the innermost layer 50a, and at least one metal layer 50c disposed between the innermost layer 50a and outermost layer 50b as with the composite package film 54 shown in FIG. 7.

The innermost layer 50a is a flexible layer. The constituent material of this layer is not limited in particular as long as it is a synthetic resin which can exhibit the flexibility mentioned above and has chemical stability (property of causing no chemical reaction, no dissolution, and no swelling) with respect to the nonaqueous electrolytic solution 30 in use and chemical stability with respect to oxygen and water (moisture in the air). Preferred is a material further having a property of low permeability to oxygen, water (moisture in the air), and components of the nonaqueous electrolytic solution 30. Examples of such a synthetic resin include engineering plastics and thermoplastic resins such as polyethylene, polypropylene, acid-denatured polyethylene, acid-denatured polypropylene, polyethylene ionomers, and polypropylene ionomers.

Here, "engineering plastics" refer to plastics having such excellent kinetic characteristics, heat resistance, and durability as to be usable in mechanical components, electric components, housing materials, and the like, examples of which include polyacetal, polyamide, polycarbonate, polyoxytetramethylene oxyterephthaloyl (polybutylene terephthalate), polyethylene terephthalate, polyimide, and polyphenylene sulfide.

When a layer made of a synthetic resin such as the outermost layer 50b is further provided in addition to the innermost layer 50a as in the composite package film 54 shown in FIG. 7, this synthetic resin layer may use a constituent material similar to that of the innermost layer 50a.

Preferably, the metal layer 50c is a layer made of a metal material having an anticorrosion property against oxygen, water (moisture in the air), and the nonaqueous electrolytic solution. Metal foils made of aluminum, aluminum alloys, titanium, and chromium, for example, may also be used as the metal layer 50c.

Though not restricted in particular, the method of sealing all the fringes 51B and 52B in the case 50 is preferably heat sealing from the viewpoint of productivity.

Figure 8:
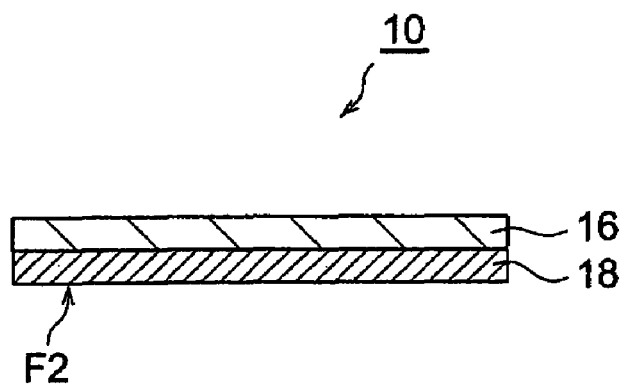
FIG. 8 is a schematic sectional view showing an example of basic configuration of the anode in the lithium-ion secondary battery shown in FIG. 1
Figure 9:
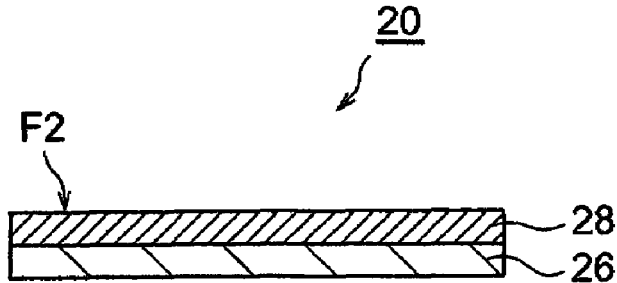
FIG. 9 is a schematic sectional view showing an example of basic configuration of the cathode in the lithium-ion secondary battery shown in FIG. 1.

The anode 10 and cathode 20 will now be explained. FIG. 8 is a schematic sectional view showing an example of basic configuration of the anode in the lithium-ion secondary battery 1 shown in FIG. 1. FIG. 9 is a schematic sectional view showing an example of basic configuration of the cathode in the lithium-ion secondary battery shown in FIG. 1.

As shown in FIG. 8, the anode 10 is constituted by a collector 16 and an anode active material containing layer 18 formed on the collector 16. As shown in FIG. 9, the cathode 20 is constituted by a collector 26 and a cathode active material containing layer 28 formed on the collector 26.

The collectors 16 and 26 are not restricted in particular as long as they are conductors which can sufficiently transfer electric charges to the anode active material containing layer 18 and cathode active material containing layer 28, respectively, whereby known collectors used in lithium-ion secondary batteries can be employed. Examples of the collectors 16 and 26 include foils of metals such as aluminum and copper.

The anode active material containing layer 18 of the anode 10 is mainly constituted by an anode active material, a conductive auxiliary agent, and a binder.

The anode active material is not restricted in particular as long as it can reversibly proceed with occlusion/release of lithium ions, desorption/insertion (intercalation) of lithium ions, or doping/undoping of lithium ions with their counter anions (e.g., $ClO_4^-$), whereby known anode active materials can be used. Examples of such an active material include carbon materials such as natural graphite, artificial graphite, mesocarbon microbeads, mesocarbon fiber (MCF), coke, glassy carbon, and fired organic carbons, metals such as Al, Si, and Sn which are combinable with lithium, amorphous compounds mainly composed of oxides such as $SiO_2$ and $SnO_2$, and lithium titanate ($Li_4Ti_5O_{12}$).

Preferred among them are carbon materials. More preferred are those having an interlayer distance $d_{002}$ of 0.335 to 0.338 nm and a crystallite size $Lc_{002}$ of 30 to 120 nm. Examples of carbon materials satisfying such conditions include artificial graphite and MCF (mesocarbon fiber). The above-mentioned interlayer distance $d_{002}$ and crystallite size $Lc_{002}$ can be determined by X-ray diffraction.

Though the amount of decomposition of propylene carbonate has been large in particular when propylene carbonate is used in a solvent in the case where a carbon material is employed as the anode active material 18, the present invention can sufficiently suppress the decomposition of propylene carbonate by employing the nonaqueous electrolytic solution 30 as a constituent.

The conductive auxiliary agent is not restricted in particular, whereby known conductive auxiliary agents can be used. Examples of the conductive auxiliary agent include carbon blacks; carbon materials; fine powders of metals such as copper, nickel, stainless, and iron; mixtures of the carbon materials and fine powders of metals; and conductive oxides such as ITO.

The binder is not restricted in particular as long as it can bind particles of the anode active material and particles of the conductive auxiliary agent to each other. Examples of the binder include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinylether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF); and styrene/butadiene rubber (SBR). This binder contributes not only to binding the particles of the anode active material and particles of the conductive auxiliary agent to each other as mentioned above, but also to binding them to the foil (collector 16).

It will be preferred if the anode active material containing layer 18 contains an electronically conductive porous body. Examples of the electronically conductive porous body include carbon materials (e.g., activated carbon) obtained by activating coking coke (e.g., petroleum coke manufactured by a delayed coker from material oils such as bottom oils of fluidized catalytic crackers for petroleum-based heavy oils and residual oils of vacuum distillers).

The cathode active material containing layer 28 of the cathode 20 is mainly constituted by a cathode active material, a conductive auxiliary agent, and a binder as with the anode active material containing layer 18.

The cathode active material is not restricted in particular as long as it can reversibly proceed with occlusion/release of lithium ions, desorption/insertion (intercalation) of lithium ions, or doping/undoping of lithium ions with their counter anions (e.g., $ClO_4^-$), whereby known anode active materials can be used. Examples of the cathode active material include mixed metal oxides such as lithium cobaltate ($LiCoO_2$), lithium nickelate ($LiNiO_2$), lithium manganese spinel ($LiMn_2O_4$), those represented by a general formula of $LiNi_xCo_yMn_zO_2$ (x+y+z=1), lithium vanadium compound ($LiV_2O_5$), olivine-type $LiMPO_4$ (where M is Co, Ni, Mn, or Fe), and lithium titanate ($Li_4Ti_5O_{12}$).

As the constituent materials other than the cathode active material contained in the cathode active material containing layer 28, materials similar to those constituting the anode active material containing layer 18 can be used as well. The binder contained in the cathode active material containing layer 28 contributes not only to binding particles of the cathode active material and particles of the conductive auxiliary agent to each other as mentioned above, but also to binding them to the foil (collector 26). It will also be preferred if the cathode active material containing layer 28 contains an electronically conductive porous body.

The collector 28 of the cathode 20 is electrically connected to one end of the cathode lead 22 made of aluminum, for example, whereas the other end of the cathode lead 22 projects out of the case 50. On the other hand, the collector 18 of the anode 10 is electrically connected to one end of the anode lead 12 made of copper or nickel, for example, whereas the other end of the anode lead 12 projects out of the case 50.

The separator 40 disposed between the anode 10 and cathode 20 is not restricted in particular as long as it is formed from an insulating porous body, whereby known separators used in lithium-ion secondary batteries can be employed. Examples of the insulating porous body in the separator 40 include laminates of films made of polyethylene, polypropylene, and polyolefin, extended films of mixtures of the resins mentioned above, and fibrous nonwoven fabrics made of at least one species of constituent material selected from the group consisting of cellulose, polyester, and polypropylene.

The inner space of the case 50 is filled with the nonaqueous electrolytic solution 30, which is partly contained within the anode 10, cathode 20, and separator 40. Employed as the nonaqueous electrolytic solution 30 is one in which a lithium salt is dissolved in an organic solvent. Examples of the lithium ion employed include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used singly or in combination of two or more species. The nonaqueous electrolytic solution 30 may be gelled by a gelling agent such as a gel polymer added thereto.

The nonaqueous solvent (organic solvent) contains, at least, PC, a first compound expressed by the following general formula (I), and a second compound expressed by the following general formula (II), whereas it will be preferred if EC and a chain carbonate (which is preferably DEC) are further added thereto. The content of propylene carbonate in the nonaqueous solvent is adjusted to 10 volume % or more, preferably 10 to 60 volume %. When EC is added, the EC content is preferably adjusted to 1 to 20 volume %. When the chain carbonate (which is preferably DEC) is added, the chain carbonate content is preferably adjusted to 30 to 85 volume %.

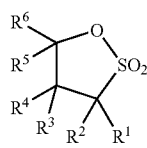

(I)

In formula (I), $R^1$, $R^2$, $R^3$, $R^4$, $R^5$, and $R^6$ are either identical to or different from each other, indicating any of a hydrogen atom and hydrocarbon groups having a carbon number of 1 to 3. It will be preferred in particular if the compound represented by the above-mentioned general formula (I) is 1,3-propane sultone in which all of $R^1$, $R^2$, $R^3$, $R^4$, $R^5$, and $R^6$ are hydrogen atoms.

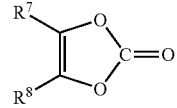

(II)

In formula (II), $R^7$ and $R^8$ are either identical to or different from each other, indicating any of a hydrogen atom and hydrocarbon groups having a carbon number of 1 to 6. It will be preferred in particular if the compound represented by the above-mentioned general formula (II) is vinylene carbonate in which all of $R^7$ and $R^8$ are hydrogen atoms.

The content X [mass %] of the first compound and the content Y [mass %] of the second compound are regulated so as to simultaneously satisfy the conditions represented by the following expressions (1) and (2):

$$2 \leq (X+Y) \leq 8 \quad (1)$$

$$0.01 \leq (Y/X) \leq 0.30 \quad (2)$$

As shown in FIGS. 1 and 2, the part of the anode lead 12 coming into contact with the seal part constituted by the fringe 51B of the first film 51 and the fringe 52B of the second film 52 is covered with an insulator 14 for preventing the anode lead 12 and the metal layer 50c in the composite package film constituting the individual films from coming into contact with each other. Further, the part of the cathode lead 22 coming into contact with the seal part constituted by the fringe 51B of the first film 51 and the fringe 52B of the second film 52 is covered with an insulator 24 for preventing the cathode lead 22 and the metal layer 50c in the composite package film constituting the individual films from coming into contact with each other.

The configurations of the insulators 14 and 24 are not restricted in particular. They may be formed from synthetic resins, for example. If the metal layer 50c in the composite package film can sufficiently be prevented from coming into contact with the anode lead 12 and cathode lead 22, the insulators 14 and 24 may be omitted.

The above-mentioned lithium-ion secondary battery 1 can attain excellent initial power generation efficiency, high-rate discharging characteristic, and charging/discharging cycle characteristic even when the anode active material containing layer 18 included in the anode 10 is constituted by a carbon material including graphite. Also, the lithium-ion secondary battery 1 can sufficiently restrain gases from occurring even when stored or caused to generate power within the range of 40 to 100° C. Therefore, when the case 50 is formed from a film in particular, the case 50 is fully prevented from expanding and causing leakage from its seal part during the use or storage of the battery 1. Therefore, the lithium-ion secondary battery 1 can yield an excellent reliability.

A method of making the above-mentioned case 50 and lithium-ion secondary battery 1 will now be explained.

The method of manufacturing a matrix 60 (a laminate in which the anode 10, separator 40, and cathode 20 are successively laminated in this order) is not limited in particular, whereby known methods employed in the manufacture of known lithium-ion secondary batteries can be used.

First, when making the anode 10 and cathode 20, the above-mentioned constituents are mixed and then dispersed into a solvent adapted to dissolve the binder, so as to make an electrode forming coating liquid (slurry or the like). The solvent is not restricted in particular as long as it is adapted to dissolve the binder and disperse the conductive auxiliary agent. For example, N-methyl-2-pyrrolidone and N,N-dimethylformamide can be used.

Subsequently, the above-mentioned electrode forming coating liquid is applied onto respective surfaces of the collectors 16 and 26, and are dried and extended, so as to form active material containing layers 18, 28 on their corresponding collectors 16 and 26. Thus, the making of the anode 10 and cathode 20 is completed. The technique for applying the electrode forming coating liquid onto the surfaces of collectors 16 and 26 is not restricted in particular, and may be determined appropriately according to the material, form, and the like of the collectors 16 and 26. Examples of the technique include metal mask printing, electrostatic coating, dip coating, spray coating, roll coating, doctor blading, gravure coating, and screen printing.

The anode lead 12 and cathode lead 22 are electrically connected to thus prepared anode 10 and cathode 20, respectively. The separator 40 is disposed between the anode 10 and cathode 20 while in contact therewith (in a nonbonding state), whereby the matrix 60 is completed.

An example of method of making the case 50 will now be explained. First, when constructing the first and second films from the above-mentioned composite package film, a known manufacturing method such as dry lamination, wet lamination, hotmelt lamination, or extrusion lamination is used for making the composite package film.

First, in this case, a film to become a layer made of a synthetic resin and a metal foil made of aluminum or the like which constitute a composite package film are prepared, for example. The metal foil can be prepared by extending a metal material, for example.

Next, the metal foil is bonded by way of an adhesive onto the film to become the synthetic resin layer, and so forth, so as to yield the above-mentioned configuration preferably composed of a plurality of layers, thereby making a composite package film (multilayer film). Then, the composite package film is cut into a predetermined size, so as to prepare a single rectangular film. In this film, the first film 51 and second film 52 are connected to each other.

Subsequently, as previously explained with reference to FIG. 2, the single film 53 is folded, and the fringe 51B of the first film 51 and the fringe 52B of the second film 52 are heat-sealed by a desirable seal width with a sealer under a predetermined heating condition, for example. Here, for securing an opening for introducing the matrix 60 into the case 50, a part is left without being heat-sealed. This yields the case 50 with an opening.

Then, the matrix 60 having the anode lead 12 and cathode lead 22 electrically connected thereto is inserted into the case 50 in the state provided with the opening. Thereafter, the nonaqueous electrolytic solution 30 is injected. Subsequently, while the anode lead 12 and cathode lead 22 are partly inserted in the case 50, the opening of the case 50 is sealed with a sealer, whereby the anode 10, cathode 20, separator 40, and nonaqueous electrolytic solution 30 are accommodated in the case 50 in a closed state. Thus, the making of the case 50 and lithium-ion secondary battery 1 is completed. The lithium-ion secondary battery of the present invention is not limited to one having such a form, but may have a cylindrical form or the like. Though the above-mentioned embodiment forms the case 50 in the lithium-ion secondary battery 1 by folding a single composite package film 53 and sealing the fringes 51B and 52B together, the case 50 can also be formed by arranging two composite package films such that they oppose each other and sealing their fringes to each other.

The present invention will now be explained in further detail with reference to examples and comparative examples, though the present invention is not restricted to these examples at all.

In the following procedure, lithium-ion secondary batteries of Examples 1 to 18 and Comparative Examples 1 to 13 each configured similar to the lithium-ion secondary battery 1 shown in FIG. 1 were made.

Example 1

First, an anode was made. Initially, for making the anode, artificial graphite (90 parts by mass) as an anode active material, carbon black (2 parts by mass) as a conductive auxiliary agent, and polyvinylidene (PVDF) (8 parts by mass) as a binder were mixed and dispersed into N-methyl-pyrrolidone (NMP), so as to yield a slurry. Thus obtained slurry was applied by doctor blading to an electrodeposited copper foil acting as a collector, and was dried at 110° C. After being dried, the slurry was extended, so as to yield the anode.

Subsequently, a cathode was made. Initially, for making the cathode, $LiNi_{(x=1/3)}Co_{(y=1/3)}Mn_{(z=1/3)}O_2$ (x+y+z=1) (90 parts by mass) as a positive electrode active material, carbon black (6 parts by mass) as a conductive auxiliary agent, and PVDF (4 parts by mass) as a binder were mixed and dispersed into NMP, so as to yield a slurry. Thus obtained slurry was applied to an aluminum foil acting as a collector, dried, and extended, so as to yield the cathode.

Next, a nonaqueous electrolytic solution was prepared. Employing a mixture of propylene carbonate (PC), ethylene carbonate (EC), and diethyl carbonate (DEC) at a volume ratio of 2:1:7 as a solvent, $LiPF_6$ was added as a solute to the solvent. Here, $LiPF_6$ was added such that its concentration became 1.5 mol/dm$^{-3}$. Further, 1,3-propane sultone was added so as to become 5 mass % with respect to the total mass of the finally obtained solution, and vinylene carbonate (VC) was added so as to become 0.5 mass % with respect to the total mass of the finally obtained solution, whereby the nonaqueous electrolytic solution was obtained.

Subsequently, thus obtained anode and cathode were laminated with a separator made of polyethylene interposed therebetween, so as to yield a laminate (matrix). Thus obtained laminate was put into an aluminum laminate pack having an opening. After injecting the nonaqueous electrolytic solution into the aluminum laminate pack from the opening, the fringes forming the opening were sealed together under vacuum, so as to make a lithium-ion secondary battery (having a length of 115 mm, a width of 87 mm, and a thickness of 3 mm). For a film of the aluminum laminate pack, a composite package film made of a laminate in which an innermost layer made of a synthetic resin (layer made of denatured polypropylene) in contact with the nonaqueous electrolytic solution, a metal layer made of an aluminum foil, and a layer made of polyamide were successively laminated in this order was used. Two such composite package films were overlaid on each other, and their fringes were heat-sealed, so as to make the aluminum laminate pack.

Examples 2 to 17 and Comparative Examples 1 to 13

Lithium-ion secondary batteries of Examples 2 to 17 and Comparative Examples 1 to 13 were made as in Example 1 except that the volume ratio of PC, EC, and DEC used in the solvent of the nonaqueous electrolytic solution and the amounts of addition of PS and VC were changed as shown in Tables 1 and 2.

Example 18

The lithium-ion secondary battery of Example 18 was made as in Example 1 except that the volume ratio of PC, EC, DEC, and EMC used in the solvent of the nonaqueous electrolytic solution and the amounts of addition of PS and VC were set as shown in Table 1.

ation tests were performed, so as to evaluate each battery. Tables 3.1, 3.2, and 4 show the following characteristic evaluation tests.

Initial Charging/Discharging Characteristic Evaluation Test After being made, each lithium-ion secondary battery was initially charged at 25° C., and was discharged immediately thereafter. The initial charging/discharging characteris-

TABLE 1

|  | PC:EC:DEC OR PC:EC:DEC:EMC (VOLUME RATIO) | X (PS)/MASS % | Y (VC)/ MASS % | (X + Y)/ MASS % | (Y/X) |
|---|---|---|---|---|---|
| EXAMPLE 1 | 2:1:7 | 5.0 | 0.5 | 5.5 | 0.100 |
| EXAMPLE 2 | 2:1:7 | 5.0 | 0.1 | 5.1 | 0.020 |
| EXAMPLE 3 | 2:1:7 | 5.0 | 0.2 | 5.2 | 0.040 |
| EXAMPLE 4 | 2:1:7 | 5.0 | 1.0 | 6.0 | 0.200 |
| EXAMPLE 5 | 2:1:7 | 2.0 | 0.2 | 2.2 | 0.100 |
| EXAMPLE 6 | 2:1:7 | 2.0 | 0.5 | 2.5 | 0.250 |
| EXAMPLE 7 | 2:1:7 | 3.0 | 0.3 | 3.3 | 0.100 |
| EXAMPLE 8 | 2:1:7 | 3.0 | 0.5 | 3.5 | 0.167 |
| EXAMPLE 9 | 2:1:7 | 4.0 | 1.0 | 5.0 | 0.250 |
| EXAMPLE 10 | 2:1:7 | 6.0 | 0.6 | 6.6 | 0.100 |
| EXAMPLE 11 | 2:1:7 | 6.0 | 1.5 | 7.5 | 0.250 |
| EXAMPLE 12 | 2:1:7 | 7.0 | 0.7 | 7.7 | 0.100 |
| EXAMPLE 18 | 2:1:4:3 | 5.0 | 0.5 | 5.5 | 0.100 |
| COMPARATIVE EXAMPLE 1 | 2:1:7 | 5.0 | 0.0 | 5.0 | 0.000 |
| COMPARATIVE EXAMPLE 2 | 2:1:7 | 5.0 | 2.0 | 7.0 | 0.400 |
| COMPARATIVE EXAMPLE 3 | 2:1:7 | 1.0 | 0.1 | 1.1 | 0.100 |
| COMPARATIVE EXAMPLE 4 | 2:1:7 | 3.0 | 3.0 | 6.0 | 1.000 |
| COMPARATIVE EXAMPLE 5 | 2:1:7 | 3.0 | 1.0 | 4.0 | 0.333 |
| COMPARATIVE EXAMPLE 6 | 2:1:7 | 7.0 | 0.05 | 7.05 | 0.007 |
| COMPARATIVE EXAMPLE 7 | 2:1:7 | 7.0 | 1.5 | 8.5 | 0.214 |
| COMPARATIVE EXAMPLE 8 | 2:1:7 | 8.0 | 0.8 | 8.8 | 0.100 |
| COMPARATIVE EXAMPLE 9 | 2:1:7 | 0.0 | 5.0 | 5.0 | — |
| COMPARATIVE EXAMPLE 10 | 2:1:7 | 0.2 | 5.0 | 5.2 | 25.00 |
| COMPARATIVE EXAMPLE 11 | 2:1:7 | 0.5 | 5.0 | 5.5 | 10.00 |
| COMPARATIVE EXAMPLE 12 | 2:1:7 | 1.0 | 5.0 | 6.0 | 5.000 |
| COMPARATIVE EXAMPLE 13 | 2:1:7 | 0.3 | 3.0 | 3.3 | 10.000 |

TABLE 2

|  | PC:EC:DEC (VOLUME RATIO) | X (PS)/ MASS % | Y (VC)/ MASS % | (X + Y)/ MASS % | (Y/X) |
|---|---|---|---|---|---|
| EXAMPLE 1 | 20:10:70 | 5.0 | 0.5 | 5.5 | 0.100 |
| EXAMPLE 13 | 10: 5:85 | 5.0 | 0.5 | 5.5 | 0.100 |
| EXAMPLE 14 | 10:10:80 | 5.0 | 0.5 | 5.5 | 0.100 |
| EXAMPLE 15 | 10:20:70 | 5.0 | 0.5 | 5.5 | 0.100 |
| EXAMPLE 16 | 27: 3:70 | 5.0 | 0.5 | 5.5 | 0.100 |
| EXAMPLE 17 | 60:10:30 | 5.0 | 0.5 | 5.5 | 0.100 |

For each of the batteries of Examples 1 to 18 and Comparative Examples 1 to 13, the following characteristic evaluation tests were performed, so as to evaluate each battery. Tables 3.1, 3.2, and 4 show the following characteristic evaluation tests.

tic was evaluated according to the ratio between the charging capacity and discharging capacity at that time. For charging, constant-current constant-voltage charging was performed at 0.2 C (500 mA) up to 4.2 V. For discharging, constant-current discharging was carried out at 0.2 C until the voltage became 2.5 V. Tables 3.1, 3.2, and 4 show thus obtained results. In Tables 3.1, 3.2, and 4, batteries exhibiting a value of 80% or higher in the results of initial charging/discharging characteristic were evaluated as those having a practically sufficient initial charging/discharging characteristic.

High-Rate Discharging Characteristic Evaluation Test The high-rate discharging characteristic was evaluated according to the ratio between the discharging capacity ($A_{2C}$) at the time of constant-current discharging at 2 C (5000 mA) and the discharging capacity ($A_{0.5C}$) at the time of constant-current discharging at 0.5 C (1250 mA) at 25° C. Tables 3.1, 3.2, and 4 show thus obtained results. In Tables 3.1, 3.2, and 4, batteries exhibiting a value of 50% or higher in the results of high-rate discharging characteristic were evaluated as those having a practically sufficient high-rate discharging characteristic.

Low-Temperature Discharging Characteristic Evaluation Test After performing constant-current constant-voltage charging at 1 C (2500 mA) up to 4.2 V at 25° C., each battery was held at −20° C. for 3 hours, and then discharging at 1 C was carried out with a cutoff of 2.5 V. The low-temperature discharging characteristic ($A_{-20°C.}/A_{25°C.}$) was evaluated according to the ratio between the −20° C. discharging capacity ($A_{-20°C.}$) and the 25° C. discharging capacity ($A_{25°C.}$). Tables 3.1, 3.2, and 4 show thus obtained results. In Tables 3.1, 3.2, and 4, batteries exhibiting a low-temperature characteristic ($A_{-20°C.}/A_{25°C.}$) of 15% or higher were evaluated as those having a practically sufficient low-temperature characteristic.

Charging/Discharging Cycle Characteristic Evaluation Test After being made, each lithium-ion secondary battery was subjected to 300 cycles of charging and discharging at 25° C., and then its discharging capacity A2 was measured. The charging/discharging cycle characteristic was evaluated according to the ratio [100×(A2/A1)][%] between the discharging capacity A1 after the initial charging and discharging and A2. For charging, constant-current constant-voltage charging was performed at 1 C (2500 mA) up to 4.2 V. For discharging, constant-current discharging was carried out at 1 C until the voltage became 2.5 V. Tables 3.1, 3.2, and 4 show thus obtained results. In Tables 3.1, 3.2, and 4 batteries exhibiting a value of 80% or higher in the results of charging/discharging cycle characteristic were evaluated as those having a practically sufficient charging/discharging cycle characteristic.

Reliability After performing constant-current constant-voltage charging at 1 C (2500 mA) up to 4.2 V at 25° C., each lithium-ion secondary battery was left at 90° C. for 4 hours, and the thickness before the battery was left and the thickness thereafter were compared with each other (in terms of the expansion during the storage at 90° C.). Tables 3.1 and 3.2 show thus obtained results. The data listed in the column of "Reliability" in Tables 3.1, 3.2, and 4 represent the increase ($F_2 − F_1$) in the thickness ($F_2$) of each battery after being left with respect to the thickness ($F_1$) therebefore in terms of relative value [$100 \times (F_2 − F_1)/F_1$] (%). In Tables 3.1 and 3.2 batteries yielding a value of 5% or less in the results were evaluated as those having a practically sufficient reliability.

TABLE 3

| | INITIAL CHARGING/ DISCHARGING CHARACTERISTIC/% | HIGH-RATE DISCHARGING CHARACTERISTIC ($A_{2C}/A_{0.5C}$)/% | LOW-TEMPERATURE CHARGING/ DISCHARGIN CHARACTERISTIC ($A_{-20°C.}/A_{25°C.}$)/% | CHARGING/ DISCHARGING CYCLE CHARACTERISTIC/% | RELIABILITY/% |
|---|---|---|---|---|---|
| EXAMPLE 1 | 87.9 | 62.8 | 25.7 | 87.9 | 0.1 |
| EXAMPLE 2 | 87.6 | 60.9 | 26.0 | 81.6 | 0.4 |
| EXAMPLE 3 | 87.9 | 61.1 | 24.9 | 86.3 | 1.0 |
| EXAMPLE 4 | 87.9 | 57.8 | 22.5 | 81.0 | 1.7 |
| EXAMPLE 5 | 84.2 | 62.7 | 26.3 | 80.4 | 1.4 |
| EXAMPLE 6 | 86.3 | 62.4 | 27.1 | 82.9 | 1.1 |
| EXAMPLE 7 | 88.1 | 62.8 | 27.9 | 88.5 | 0.3 |
| EXAMPLE 8 | 88.1 | 59.9 | 28.6 | 90.3 | 0.9 |
| EXAMPLE 9 | 87.9 | 58.3 | 23.1 | 80.8 | 1.4 |
| EXAMPLE 10 | 88.2 | 56.2 | 21.1 | 85.9 | 0.8 |
| EXAMPLE 11 | 87.7 | 51.8 | 17.8 | 80.4 | 1.1 |
| EXAMPLE 12 | 88.0 | 51.4 | 17.6 | 82.6 | 0.7 |
| EXAMPLE 18 | 87.5 | 67.6 | 30.1 | 86.4 | 1.2 |
| COMPARATIVE EXAMPLE 1 | 87.6 | 60.7 | 26.3 | 75.4 | 1.0 |
| COMPARATIVE EXAMPLE 2 | 88.1 | 53.3 | 19.6 | 78.9 | 1.5 |
| COMPARATIVE EXAMPLE 3 | 67.8 | 63.1 | 27.6 | 38.1 | 20.4 |
| COMPARATIVE EXAMPLE 4 | 88.7 | 57.7 | 21.4 | 68.3 | 1.4 |
| COMPARATIVE EXAMPLE 5 | 87.2 | 61.4 | 26.9 | 79.0 | 0.6 |
| COMPARATIVE EXAMPLE 6 | 87.7 | 53.8 | 20.0 | 76.2 | 0.9 |
| COMPARATIVE EXAMPLE 7 | 88.3 | 46.3 | 12.3 | 79.8 | 1.9 |
| COMPARATIVE EXAMPLE 8 | 87.6 | 48.1 | 13.1 | 81.7 | 1.2 |
| COMPARATIVE EXAMPLE 9 | 82.5 | 55.7 | 22.0 | 91.5 | 11.8 |
| COMPARATIVE EXAMPLE 10 | 86.5 | 55.9 | 23.6 | 48.4 | 6.1 |
| COMPARATIVE EXAMPLE 11 | 87.1 | 61.1 | 22.8 | 46.8 | 2.6 |
| COMPARATIVE EXAMPLE 12 | 86.6 | 61.2 | 20.3 | 53.2 | 0.2 |
| COMPARATIVE EXAMPLE 13 | 85.8 | 63.4 | 24.7 | 55.3 | 2.1 |

TABLE 4

| | INITIAL CHARGING/ DISCHARGING CHARACTERISTIC/% | HIGH-RATE DISCHARGING CHARACTERISTIC ($A_{2C}/A_{0.5C}$)/% | LOW-TEMPERATURE CHARGING/ DISCHARGIN CHARACTERISTIC ($A_{-20°C}/A_{25°C}$)/% | RELIABILITY/% |
|---|---|---|---|---|
| EXAMPLE 1 | 87.9 | 62.8 | 25.7 | 0.1 |
| EXAMPLE 13 | 87.1 | 63.8 | 27.6 | 4.1 |
| EXAMPLE 14 | 87.4 | 66.2 | 28.3 | 2.8 |
| EXAMPLE 15 | 88.2 | 58.3 | 19.3 | 0.6 |
| EXAMPLE 16 | 86.9 | 64.1 | 28.8 | 2.6 |
| EXAMPLE 17 | 81.2 | 59.7 | 16.2 | 0.1 |

INDUSTRIAL APPLICABILITY

As explained in the foregoing, the present invention can provide a nonaqueous electrolytic solution which can easily and reliably construct a lithium-ion secondary battery capable of attaining excellent initial power generation efficiency, high-rate discharging characteristic, and charging/discharging cycle characteristic, while being able to achieve an excellent reliability even when stored or caused to generate power within the range of 40 to 100° C.

Also, the present invention can provide a high-performance lithium-ion secondary battery capable of attaining excellent initial power generation efficiency, high-rate discharging characteristic, and charging/discharging cycle characteristic, while being able to achieve an excellent reliability even when stored or caused to generate power within the range of 40 to 100° C.

The invention claimed is:

1. A nonaqueous electrolytic solution including a nonaqueous solvent and a lithium salt soluble in the nonaqueous solvent;
wherein the nonaqueous solvent contains propylene carbonate, a first compound expressed by the following general formula (I), and a second compound expressed by the following general formula (II);
wherein the content of propylene carbonate in the nonaqueous solvent is at least 10 volume %; and
wherein the content X [mass %] of the first compound and the content Y [mass %] of the second compound simultaneously satisfy the conditions represented by the following expressions (1) and (2):

$$2 \leq (X+Y) \leq 8 \quad (1)$$

$$0.02 \leq (Y/X) \leq 0.25 \quad (2)$$

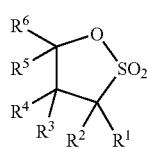
(I)

where $R^1$, $R^2$, $R^3$, $R^4$, $R^5$, and $R^6$ are either identical to or different from each other, indicating any of a hydrogen atom and hydrocarbon groups having a carbon number of 1 to 3;

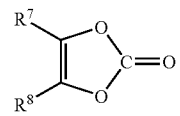
(II)

where $R^7$ and $R^8$ are either identical to or different from each other, indicating any of a hydrogen atom and hydrocarbon groups having a carbon number of 1 to 6.

2. A nonaqueous electrolytic solution according to claim 1, wherein the content of propylene carbonate in the nonaqueous solvent is 10 to 60 volume %.

3. A nonaqueous electrolytic solution according to claim 1, wherein the nonaqueous solvent further contains ethylene carbonate, the content of ethylene carbonate being 1 to 20 volume %.

4. A nonaqueous electrolytic solution according to claim 1, wherein the nonaqueous solvent further contains a chain carbonate, the content of chain carbonate being 30 to 85 volume %.

5. A nonaqueous electrolytic solution according to claim 4, wherein the chain carbonate is diethyl carbonate and/or ethylmethyl carbonate.

6. A nonaqueous electrolytic solution according to claim 1, wherein $R^1$, $R^2$, $R^3$, $R^4$, $R^5$, and $R^6$ in the first compound are hydrogen atoms.

7. A nonaqueous electrolytic solution according to claim 1, wherein $R^7$ and $R^8$ in the second compound are hydrogen atoms.

8. A lithium-ion secondary battery comprising, at least:
an anode;
a cathode;
an insulating separator disposed between the anode and cathode;
a nonaqueous electrolytic solution containing a lithium salt; and
a case accommodating the anode, cathode, separator, and nonaqueous electrolytic solution in a closed state;
wherein the nonaqueous electrolytic solution is the nonaqueous electrolytic solution according to claim 1.

9. A lithium-ion secondary battery according to claim 8, wherein the case is formed from a flexible film.

10. A lithium-ion secondary battery according to claim 8, wherein the film is a composite package film comprising, at least, an innermost layer made of a synthetic resin in contact with the nonaqueous electrolytic solution and a metal layer disposed on the outside of the innermost layer.

11. A lithium-ion secondary battery according to claim 8, wherein each of the anode and cathode has a planar form and contains an electronically conductive porous body as a constituent material;

wherein the separator has a planar form and is made of an insulating porous body; and wherein the nonaqueous electrolytic solution is at least partly contained within the anode, cathode, and separator.

12. A lithium-ion secondary battery according to claim 8, wherein the anode contains an anode active material, the anode active material being a carbon material.

13. A lithium-ion secondary battery according to claim 12, wherein the carbon material contains graphite.

* * * * *